(12) United States Patent
Martin et al.

(10) Patent No.: US 12,397,840 B2
(45) Date of Patent: *Aug. 26, 2025

(54) PALLET SLED AND DELIVERY SYSTEM

(71) Applicant: Rehrig Pacific Company, Los Angeles, CA (US)

(72) Inventors: Robert Lee Martin, Kenosha, WI (US); Jason Crawford Miller, Bedford, TX (US); Dane Gin Mun Kalinowski, Foothill Ranch, CA (US)

(73) Assignee: Rehrig Pacific Company, Monterey Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/386,131

(22) Filed: Nov. 1, 2023

(65) Prior Publication Data
US 2024/0059338 A1 Feb. 22, 2024

Related U.S. Application Data

(63) Continuation of application No. 17/358,103, filed on Jun. 25, 2021, now Pat. No. 11,840,271.
(Continued)

(51) Int. Cl.
*B62B 5/00* (2006.01)
*B62B 3/06* (2006.01)
(Continued)

(52) U.S. Cl.
CPC .......... *B62B 5/0096* (2013.01); *B62B 3/0625* (2013.01); *B66F 9/065* (2013.01); *B66F 9/0755* (2013.01); *G01G 19/08* (2013.01); *G05B 19/4155* (2013.01); *G06K 7/10297* (2013.01); *G06K 7/10405* (2013.01); *G07C 5/008* (2013.01); *G07C 5/08* (2013.01); *G05B 2219/32391* (2013.01)

(58) Field of Classification Search
None
See application file for complete search history.

(56) References Cited

U.S. PATENT DOCUMENTS 3,576,333 A * 4/1971 Danielson ............. B62B 3/0618
280/43.12
4,061,237 A * 12/1977 Austin ................ B66F 9/07563
414/592
(Continued)

FOREIGN PATENT DOCUMENTS

JP 2019182560 A * 10/2019

*Primary Examiner* — Fekadeselassie Girma
(74) *Attorney, Agent, or Firm* — Carlson, Gaskey & Olds, P.C.

(57) ABSTRACT

A pallet sled includes a pair of tines extending forward from a base. A load wheel supports each of the pair of tines. The load wheels are each configured to move away from the respective tine to lift the respective tine upward relative to a support surface on which the load wheel is supported. A processor on the pallet sled records usage of the sled, such as lift cycles, location over time, battery condition, lift height, weight lifted, distance traveled, and the like. A communication circuit may be configured to send data from the pallet sled to a remote server. An identification reader may be configured to read an identification tag of an object supported on the pair of tines, such as an rfid tag on a pallet.

26 Claims, 9 Drawing Sheets

Related U.S. Application Data

(60) Provisional application No. 63/044,238, filed on Jun. 25, 2020.

(51) Int. Cl.
| | | |
|---|---|---|
| *B66F 9/065* | (2006.01) | |
| *B66F 9/075* | (2006.01) | |
| *G01G 19/08* | (2006.01) | |
| *G05B 19/4155* | (2006.01) | |
| *G06K 7/10* | (2006.01) | |
| *G07C 5/00* | (2006.01) | |
| *G07C 5/08* | (2006.01) | |

(56) References Cited

U.S. PATENT DOCUMENTS

| | | | | |
|---|---|---|---|---|
| 6,669,089 | B2* | 12/2003 | Cybulski | B66F 9/0755 |
| | | | | 235/383 |
| 6,855,894 | B1* | 2/2005 | Van Seumeren | B62B 3/0606 |
| | | | | 177/139 |
| 7,401,054 | B1* | 7/2008 | Shah | G06F 16/289 |
| | | | | 707/999.103 |
| 7,974,925 | B2* | 7/2011 | Shah | G06F 16/289 |
| | | | | 709/229 |
| 7,976,032 | B1* | 7/2011 | Dockins | B62B 3/0618 |
| | | | | 187/229 |
| 7,979,355 | B2* | 7/2011 | Shah | G06F 16/289 |
| | | | | 709/229 |
| 8,979,099 | B1* | 3/2015 | Ellis | B66F 9/142 |
| | | | | 280/43.12 |
| 10,336,543 | B1* | 7/2019 | Sills | G05D 1/0094 |
| 11,068,841 | B1* | 7/2021 | Lui | G06K 7/10376 |
| 11,279,569 | B1* | 3/2022 | Theobald | B65G 47/912 |
| 11,840,271 | B2 | 12/2023 | Martin, Jr. et al. | |
| 2005/0200457 | A1* | 9/2005 | Bridgelall | G06K 7/10346 |
| | | | | 340/10.3 |
| 2006/0181039 | A1* | 8/2006 | Fridlington, Jr. | B62B 3/0618 |
| | | | | 280/43.12 |
| 2006/0231312 | A1* | 10/2006 | Passeri | B62B 3/0612 |
| | | | | 280/47.11 |
| 2006/0255949 | A1* | 11/2006 | Roeder | G06K 7/10079 |
| | | | | 340/572.7 |
| 2008/0044265 | A1* | 2/2008 | Borntrager | B66F 9/065 |
| | | | | 211/1.51 |
| 2008/0243873 | A1* | 10/2008 | Shah | G06F 21/6227 |
| 2008/0243915 | A1* | 10/2008 | Shah | G06F 16/289 |
| 2009/0059004 | A1* | 3/2009 | Bochicchio | B66F 17/003 |
| | | | | 348/148 |
| 2009/0115966 | A1* | 5/2009 | Waldorf | A61B 3/113 |
| | | | | 351/210 |
| 2009/0183953 | A1* | 7/2009 | Ellington | B62B 3/0606 |
| | | | | 187/231 |
| 2009/0240554 | A1* | 9/2009 | Oswald | G06Q 50/26 |
| | | | | 348/207.1 |
| 2009/0303035 | A1* | 12/2009 | Kirtley, Jr. | G08B 13/24 |
| | | | | 340/539.11 |
| 2012/0223812 | A1* | 9/2012 | Kail | B66F 9/085 |
| | | | | 340/10.1 |
| 2012/0269606 | A1* | 10/2012 | Newell | B62B 3/0612 |
| | | | | 414/495 |
| 2014/0291594 | A1* | 10/2014 | Newell | B62B 5/0033 |
| | | | | 254/2 R |
| 2016/0376135 | A1* | 12/2016 | Kim | B66F 9/0755 |
| | | | | 701/50 |
| 2017/0011364 | A1* | 1/2017 | Whitman | H04L 67/01 |
| 2017/0325675 | A1* | 11/2017 | Liu | A61B 3/0025 |
| 2017/0349197 | A1* | 12/2017 | Jonasson | B66F 9/063 |
| 2018/0029797 | A1* | 2/2018 | Hance | B65G 1/0492 |
| 2018/0114415 | A1* | 4/2018 | Mattingly | G08B 21/182 |
| 2018/0121864 | A1* | 5/2018 | Sullivan | B65G 67/02 |
| 2020/0002143 | A1* | 1/2020 | Hasegawa | G05D 1/0246 |
| 2020/0269896 | A1* | 8/2020 | Kalinowski | B62B 3/0618 |
| 2020/0327497 | A1* | 10/2020 | Marvizadeh | G06Q 10/08355 |
| 2021/0272037 | A1* | 9/2021 | Hanebeck | G06Q 10/08 |
| 2021/0403066 | A1* | 12/2021 | Martin, Jr. | G05B 19/4155 |
| 2021/0403103 | A1* | 12/2021 | Alshaalan | B66F 9/07554 |

* cited by examiner

PALLET SLED AND DELIVERY SYSTEM

BACKGROUND

Many items are delivered to stores on pallets. A plurality of loaded pallets may be loaded onto a truck. One or more of the pallets may be destined for each of a plurality of stores. At each store, the driver uses a pallet sled (which may be a pallet jack or the like) to lift one or more pallets and bring them into the store. In the store, the pallets may be unloaded. The empty pallets are then returned to the truck on the pallet sled.

SUMMARY

A pallet sled includes a pair of tines extending forward from a base. A load wheel supports each of the pair of tines. The load wheels are each configured to move away from the respective tine to lift the respective tine upward relative to a support surface on which the load wheel is supported. A processor on the pallet sled records usage of the sled, such as lift cycles, location over time, battery condition, lift height, weight lifted, distance traveled, and the like. A communication circuit may be configured to send data from the pallet sled to a remote server. An identification reader may be configured to read an identification tag of an object supported on the pair of tines, such as an rfid tag on a pallet.

The pallet sled may further include a gps receiver mounted on the sled, the communication circuit configured to receive a location of the pallet sled from the gps receiver and transmit the location to the remote server.

The pallet sled may include an rfid reader configured to read an rfid tag of a pallet on the tines of the pallet sled. The pallet sled may include a processor programmed to analyze the rfid tag of the pallet on the tines to determine if the pallet on the tines should be delivered. The pallet sled may include a gps receiver mounted on the sled wherein the processor is programmed to determine if the pallet on the tines should be delivered based upon a current location as determined by the gps receiver.

The pallet sled may include a weight sensor configured to weigh objects on the pair of tines. The processor may be programmed to analyze a weight of the pallet on the tines and to determine based upon a weight of the pallet if the pallet is loaded correctly.

The processor may be programmed to monitor usage of the pallet sled and to communicate data regarding the usage of the pallet sled to the remote server. The usage of the sled that the processor is programmed to monitor may include time at each store to which the pallet sled is used to deliver items. The usage of the sled that the processor is programmed to monitor may include unloading time in a store.

The processor may be programmed to monitor number of cycles that the pair of tines are raised to a lift position.

A method for making a delivery using the pallet sled may include the step of reading an identification tag of a first pallet of a plurality of pallets with the identification reader. Each of the plurality of pallets loaded with a plurality of items. Each of the plurality of pallets has an identification tag associating said each pallet with a different one of a plurality of stores including a first store. The method further includes determining a current location of the plurality of pallets to be at the first store. Based upon the current location and the identification tag, it is determined if the identification tag of the first pallet is associated with the first store. Based upon a determination that the pallet id of the first pallet is associated with the first store), the first pallet is delivered to the first store with the pallet sled.

A method for operating a pallet sled may include the step of bringing the pallet sled and a plurality of pallets to a first store in a truck, each of the plurality of pallets having at least one item stacked thereon. At least one tine of the pallet sled is positioned below a first pallet of the plurality of pallets. The at least one tine of the pallet sled is raised to lift the first pallet. The first pallet is brought from the truck to the first store on the at least one tine of the pallet sled. The at least one tine of the pallet sled may be lowered in the store to lower the first pallet onto a floor in the store. The at least one item on the first pallet is unloaded in the store.

The first pallet with the at least one tine is lifted in the store. The first pallet is brought from the store to the truck on the pallet sled. At least one of distance, weight, or cycles of the pallet sled is monitored during the forgoing steps.

The data gathered may be recorded on the pallet sled. The data gathered during said step i) may be transmitted from the pallet sled to a remote server.

A pallet sled includes a base and a pair of tines extending forward from the base. A load wheel supports each of the pair of tines. The load wheels are each configured to move away from the respective tine to lift the respective tine upward relative to a support surface. A processor recording data reflective of usage of the pallet sled. The processor may also record cycles of the pair of tines being lifted. The processor may record a location of the pallet sled over time.

DETAILED DESCRIPTION

Figure 1:
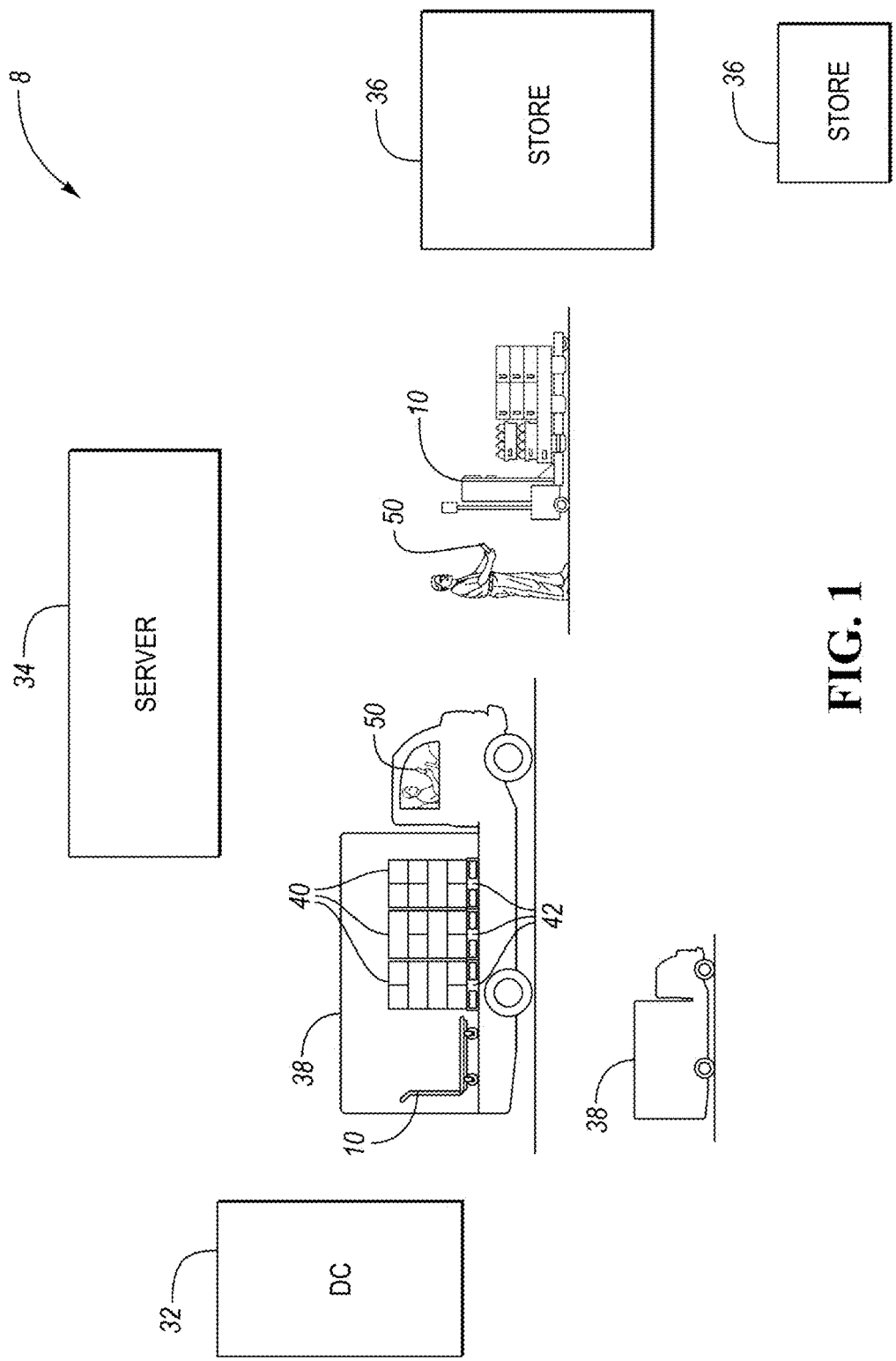
FIG. 1 is a schematic view of a delivery system.

FIG. 1 is a high-level view of a delivery system 8 including one or more distribution centers 32, a central server 34 (e.g. cloud computer), and a plurality of stores 36. A plurality of trucks 38 or other delivery vehicles each transport a plurality of the items 40 on pallets 42 from one of the distribution centers 32 to a plurality of stores 36. A wheeled pallet sled 10 is on each truck 38 to facilitate delivery of one of more pallets 42 of goods 40 to each store 36.

At each store 36 the driver's mobile device 50 indicates which of the loaded pallets 42 (based upon their pallet ids) are to be delivered to that store 36 as verified by gps on the mobile device 50. The driver chooses the correct pallet(s) 42 for that location by reading the pallet id (rfid, barcode, etc) with the mobile device 50. The driver moves one or more of the loaded pallets 42 into the store 36 at a time with the pallet sled 10.

Figure 2:
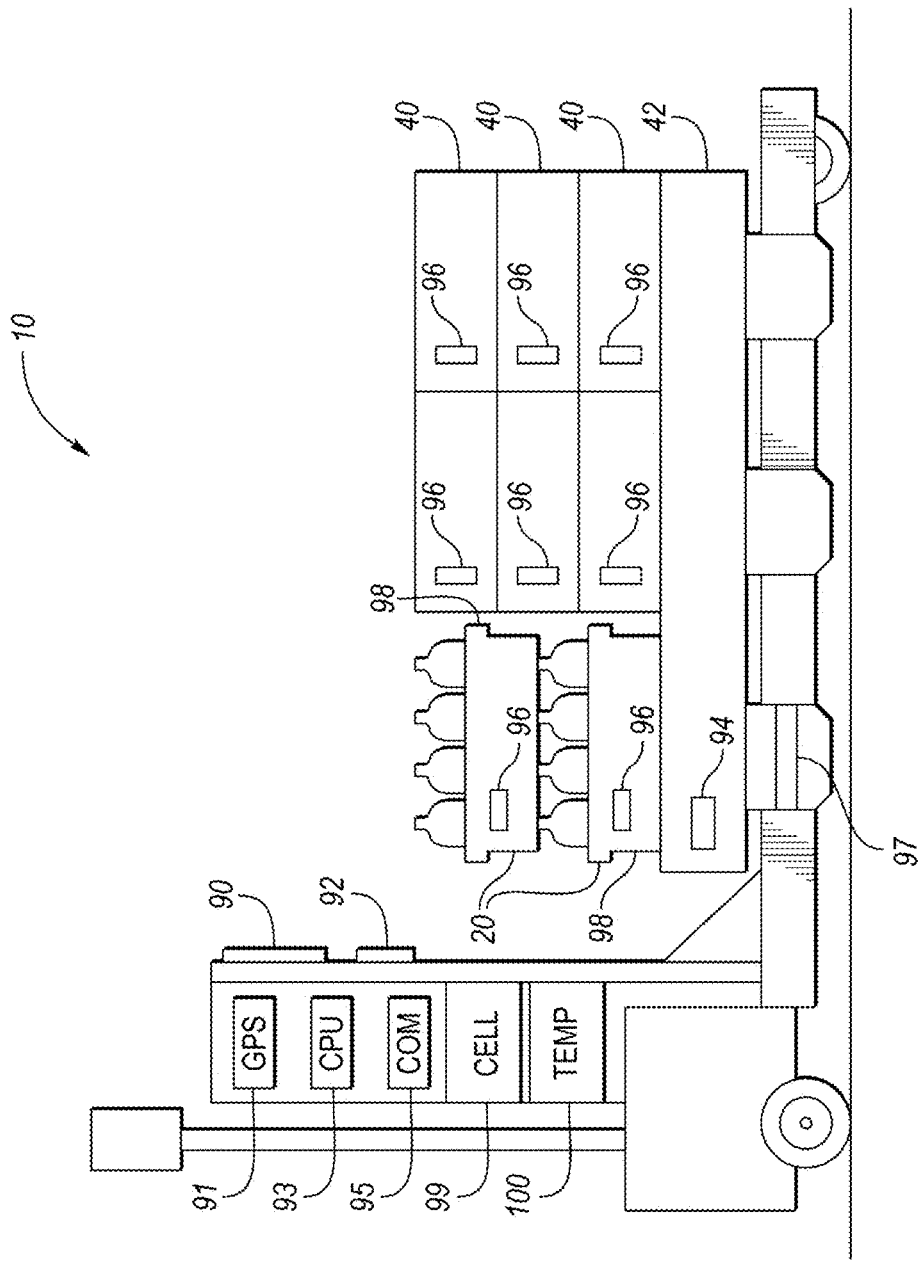
FIG. 2 is a schematic of the pallet sled of FIG. 1 according to one embodiment.

FIG. 2 is a schematic of the pallet sled 10. The pallet sled 10 can include an identification reader, such as an rfid reader 90, to check the pallet identification of pallet 42 carried thereon by reading the identification tag, such as rfid tag 94, secured to the pallet 42. The pallet 42 may be a half pallet as shown or a full pallet. The rfid reader 90 may also read rfid tags 96 on the items 40 (if so provided). The rfid reader 90 and rfid tag 94 can be active, passive or a mixture of any radio frequency identification systems. Alternatively, the identification reader and identification tag could utilize other electromagnetic signals to provide a pallet id from the id tag to the id reader, such as optical, including bar codes, qr codes, or the like.

Optionally the pallet sled 10 may include a camera 92 for imaging the loaded pallet 42 carried thereon for validation. In the configuration shown, the camera 92 would only image the short side of the loaded pallet 42 (and the top of the loaded pallet 42).

A GPS receiver 91 ("GPS" referring generically to any global navigation satellite system) or other location-determining device may be mounted to the pallet sled 10. A CPU 93 (with associated memory, storage, processor, suitable programming, etc and optionally a touch screen and keyboard and mouse) can also be mounted to the pallet sled 10 and is connected to the other devices on the pallet sled 10.

A local wireless communication circuit 95 (e.g. Bluetooth) is also connected to the CPU 93. The communication circuit 95 may communicate the pallet id of the pallet 42 on the pallet sled 10 to the driver's mobile device 50 and/or to the CPU 93. A weight sensor 97 may be integrated into the pallet sled 10 configured to measure weight on the tines to provide a weight of the loaded pallet 42 to the CPU 93 and/or mobile device 50.

A cell data circuit 99 could also be included on the pallet sled 10 and could be used to communicate directly with the central server 34 (FIG. 1), including sending and receiving data and commands. Alternatively, the local communication circuit 95 could provide that same communication by accessing the cell data circuit on the driver's mobile device 50 (e.g. "tethering").

The pallet sled 10 could also include a temperature sensor 100. The temperature sensor 100 could monitor ambient air temperature or specifically a temperature of a battery that powers the pallet sled 10. Optionally, two temperature sensors could monitor both ambient air and battery temperature. The temperature sensor(s) 100 report measured temperature to the CPU 93 when polled or periodically.

Much of the hardware on the pallet sled 10 including the CPU 93, GPS receiver 91, camera 92, communication circuit 95, and cell data circuit 99 could all be provided in the form of a mobile device (e.g. smartphone or tablet) mounted to the pallet sled 10. The CPU 93 is connected to all of the hardware and sensors on the sled 10. The CPU 93 also controls actuation of the tines, as directed by the user. For example, the CPU 93 controls the actuator for lifting the tines and, optionally, an actuator for adjusting the tines toward one another.

Optionally, all data is stored locally on CPU 93 and retrieved by a computer at the DC 32 via the local communication circuit 95 whenever the pallet sled 10 returns to the DC 32. The CPU 93 processes event triggers, such as delivery of a pallet 42. Alternatively, the data is sent directly to the server 34 by the CPU 93 via the communication circuit 95.

In use, at each store 36, the driver selects one or more of the loaded pallets 42 intended for that store 36 and loads it on the pallet sled 10 in the truck 38. Based upon reading the rfid tag 94 on the pallet 42 and the current location from the gps receiver 91, the pallet sled 10 determines whether the pallet 42 on the pallet sled 10 is assigned to the store 36 at the current location by accessing information from the server 34 from locally-stored list associating pallet ids and stores 36. The pallet sled 10 may indicate a correct pallet 42 or an incorrect pallet 42 with a display (or other visual indicator) and/or sound on the pallet sled 10 and/or a notification sent to the driver's mobile device 50.

The camera 92 on the pallet sled 10 may take one or more images and send them to the server 34. The server 34 analyzes the image(s) to confirm the presence of the correct number of items 40 of each of the SKUs associated with the pallet id of that pallet 42, and then communicates a confirmation to the pallet sled 10, the driver's mobile device 50 and/or the store employee's mobile device, which is displayed on the screens. The server 34 may use machine learning or other image analysis techniques to identify the SKUs on the pallet 42.

If the pallet sled 10 weighs the loaded pallet 42, this information can also be used to validate the loaded pallet 42. The CPU 93 (or server 34) compares the weight from weight sensor 97 to an expected weight of the empty pallet 42 plus the expected weight of all the SKUs that should be loaded on the pallet 42. Alternatively, the CPU 93 (or server 34) can compare the weight from the weight sensor 97 to an actual weight of the loaded pallet 42 that was measured at the DC 32 after it was loaded. This verifies that nothing has changed (added or removed) since the pallet 42 was loaded and verified at the DC 32.

If the pallet sled 10 only images the short side of the loaded pallet 42, then a complete validation of the items 40 on the loaded pallet 42 cannot be done, but it can be enough of a confirmation that the items 40 on the loaded pallet 42 have not been disturbed since leaving the distribution center, especially if the loaded pallet 42 is wrapped and especially again if the loaded pallet 42 has the right weight.

If a discrepancy is detected, the CPU 93 indicates the discrepancy to the driver (either via an interface on the CPU 93 or via the driver's mobile device 50). There may only be a general indication of a discrepancy if the system does not have enough information (e.g. only a short side image), or the system may be able to indicate the specific discrepancy and how to remedy the discrepancy to the driver.

If a general discrepancy is indicated, the driver can then use the driver's mobile device 50 to take a plurality of images of the loaded pallet 42 (or possibly a single image from a corner). These images can be uploaded to the server 34 to be processed e.g. via machine learning to identify specific SKUs on the loaded pallet 42 and to identify a specific discrepancy for the driver to correct (e.g. one or more missing SKUs and/or extra SKUs).

The driver can correct the discrepancy by retrieving items 40 of the missing SKUs from the truck 38 or crediting the missing SKUs to the store account 42. Any SKUs detected that do not belong on the pallets 42 can be returned by the driver to the truck 38. On the store worker's mobile device 52 (via an app), the store worker confirms the presence of the loaded pallet 42 and receives a list of SKUs associated with that pallet id from the server 34.

The pallet sled 10 can also assist in tracking the return of the pallets 42 and returnable packaging such as plastic beverage crates 98. The pallet sled 10 can count the number of crates 98 and the pallets 42 that are being returned to the truck 38 and report those numbers to the server 34. If the returnable packaging, such as plastic beverage crates 98, have rfid tags 96, the rfid reader 90 on the pallet sled 10 can count the number of crates 98 that are being returned to the truck 38. The camera 92 and/or weight sensor 97 can also estimate the type and quantity of returnable packaging and/or pallets 42 that is being returned. Over time, this can provide asset tracking information. For example, this enables the server 34 to determine if the number of pallets 42 and/or number of crates 98 delivered to a particular store 36 consistently exceeds the number of pallets 42 and/or number of crates 98 that are returned from that store 36, thus indicating that the store 36 is experiencing a high rate of asset loss for some reason, which can then be investigated and remedied.

The CPU 93 tracks the location of the pallet sled 10 via the GPS receiver 91 over time. The CPU 93 tracks when the pallet sled 10 lifts a pallet 42 (because the CPU 93 activates the actuator to lift the tines), the weight lifted by the pallet sled 10 each time, which pallet 42 is lifted by the pallet sled 10 (and when), and/or which pallet 42 is carried by the pallet sled 10 into which store 36 (and when). This information is transmitted to server 34.

The CPU 93 monitors and accumulates biometric data of the pallet sled 10, such as time in the truck 38, time walking from the truck 38 to the store 36, time for check-in, time for stocking shelves and/or, time for check out, time walking from store to truck. Time in the truck can be determined from the GPS receiver 91. Time walking from the truck 38 to the store 36 can be determined from the GPS receiver 91. Time for check-in can be determined as time after the pallet sled 10 is in the store 36 before pallet unloading begins, as determined by the camera 92 and/or the weight sensor 97 detecting removal of the items 40 and/or the actuator lowering the tines. Time for stocking shelves can be determined as time after the pallet sled 10 is in the store 36 after pallet unloading begins, as determined by the camera 92 and/or the weight sensor 97 detecting removal of the items 40, until pallet 42 is determined to be empty by the camera 92 and/or weight sensor 97. Time for check out can be determined to be time after the pallet 42 is empty until pallet sled 10 is moved out of the store 36, as determined by GPS receiver 91 and/or camera 92. Time walking from the store to the truck 38 can be determined by the GPS receiver 91 and/or camera 92.

This data is all sent to the server 34 (FIG. 1) and compiled for the plurality of pallet sleds 10. With this data, the server 34 determines the time spent for each stop (each store) and for each route. The server 34 determines the time spent by customer and by franchise. The server 34 reconciles assets (pallets 42 and returnable packaging, such as crates 98), as explained above. The server 34 determines seasonality trends, performs drive and route comparisons, performs region metrics comparisons, and provides industry comparisons.

The CPU 93 collects data regarding usage of the pallet sled 10 from multiple sensors on the pallet sled 10, such as one or more of the following: a sensor detecting lift cycles (how many times the pallet sled 10 has lifted a pallet 42) or the actuations of the lift actuator commanded by the CPU 93, the weight sensor 97 (how much weight is being lifted by the pallet sled 10 and how much weight is on the pallet sled 10 as it is being rolled a measured distance across parking lots and store floors), how much distance has the pallet sled 10 been rolled while empty and while loaded, average and extreme temperatures experienced by the pallet sled 10 during use. If the pallet sled 10 has expandable tines, the CPU 93 collects cycles of the expansion and retraction of the expandable tines. This collected data is sent to the server 34 for preventative and predictive maintenance analysis.

FIGS. 3-8 show one possible configuration of the mechanical features of the pallet sled 10. Referring to FIG. 1, the pallet sled 10 includes a lift module or base 12 containing the lift mechanisms and the tine spacing actuators 15. The base 12 may also contain all of the hardware shown schematically in FIG. 2, most of which could be provided in a mobile device (such as smart phone or tablet). The base 12 is connected to a pair of fork tines 14. The base 12 can raise and lower the fork tines in a known manner, by leveraging the load wheels 16 supporting the tines 14, such as by hydraulics, pneumatics, electric motors, or via a manual actuator. The base 12 can also move the tines toward and away from one another with the tine spacing actuators 15, which could be hydraulics, pneumatics, electric motors driving a ball screw or a threaded rod, or via a manual actuator.

The pallet jack mechanism could be semi-electric, e.g. electric drive system and manual lifting (via pumping the tiller arm) or full-electric, e.g. electric drive system and electric lifting/lowering. In this example, the lift is semi- or full-electric, so battery power exists on the equipment to drive the actuators whether it be an electric hydraulic pump or electric motor. Other power sources could be provided, including manual.

The pallet sled 10 may provide a first mechanism for facilitating the adjustment of the tine spacing without dragging the load wheels 16.

Figure 4:
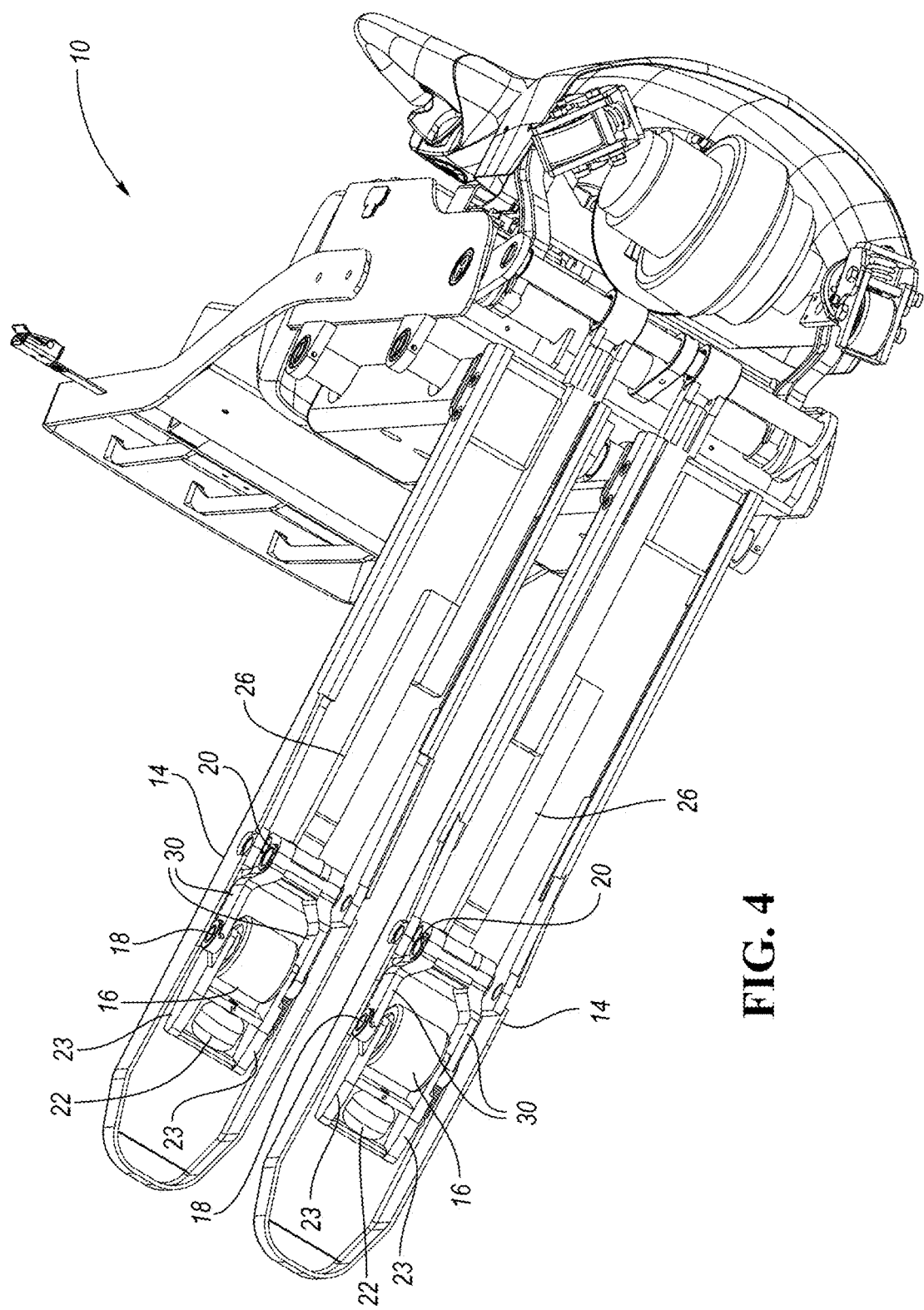
FIG. 4 is a perspective view of the underside of the pallet sled of FIG. 1.

FIG. 4 is a perspective view of the underside of the tines 14 of FIG. 1. Each tine 14 includes a load wheel 16 which is rotatable on an axis 18 perpendicular to the long axis of the tine 14. The load wheel axis 18 is mounted at the end of a pair of arms 30 which are pivotable about an axis 20 fixed to the tine 14. The axis 20 is spaced rearwardly of the axis 18, and also perpendicular to the long axis of the tine 14. A side wheel 22 is mounted to arms 23 extending forwardly of the load wheel 16 and is oriented in a direction such that its axis is transverse to the load wheel axis 18. The arms 23 are pivotable about the axis 18 (but could alternatively pivot about an axis parallel to that load wheel axis 18) in a vertical plane parallel to the long axis of the tine 14.

As explained below, the side wheel 22 can facilitate lateral motion of the tine 14. A push rod 26 within each tine 14 pivots the arms 30 to deploy and retract the load wheels 16, in a known manner.

Figure 3:
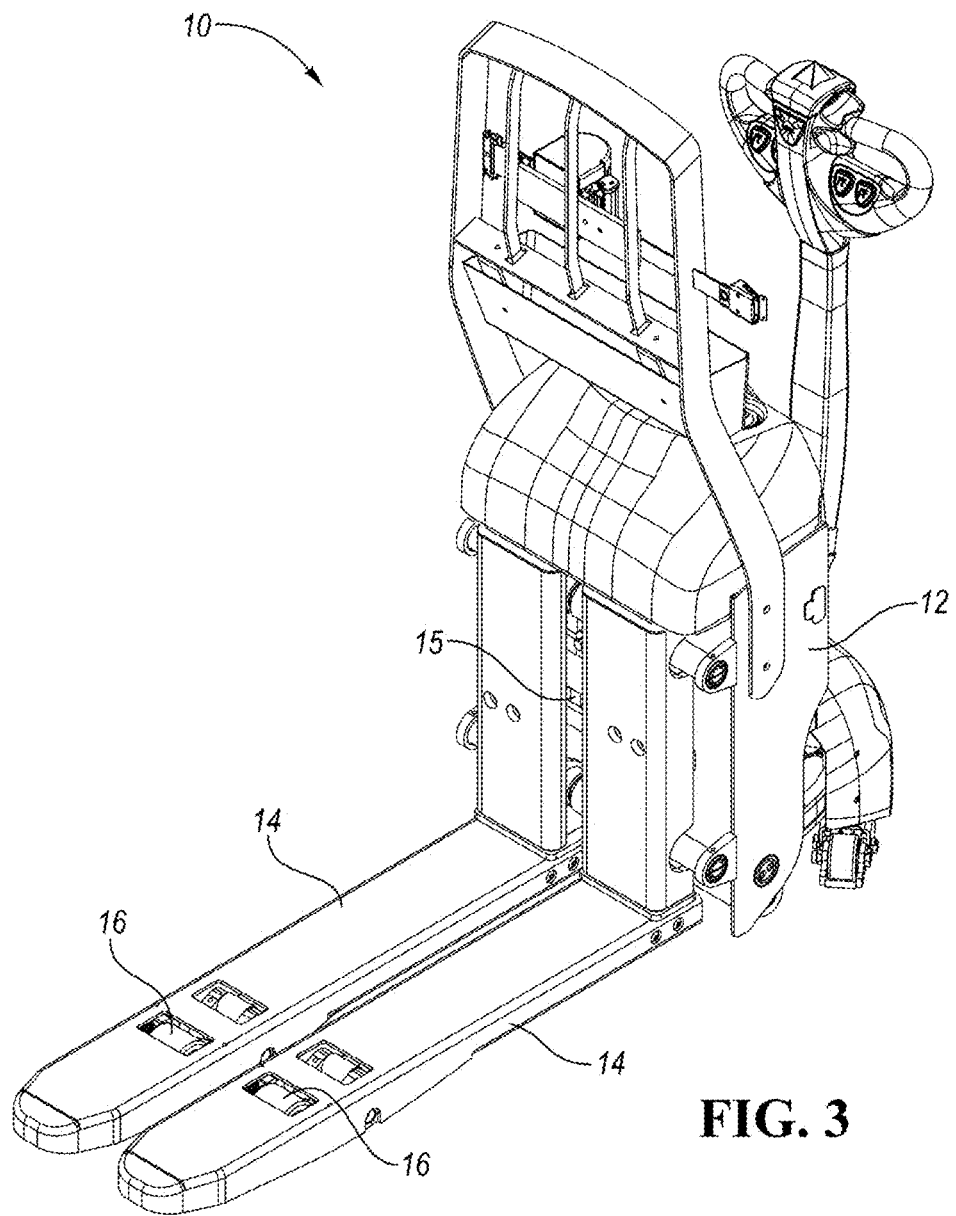
FIG. 3 is a perspective view of the pallet sled of FIG. 2.
Figure 5:
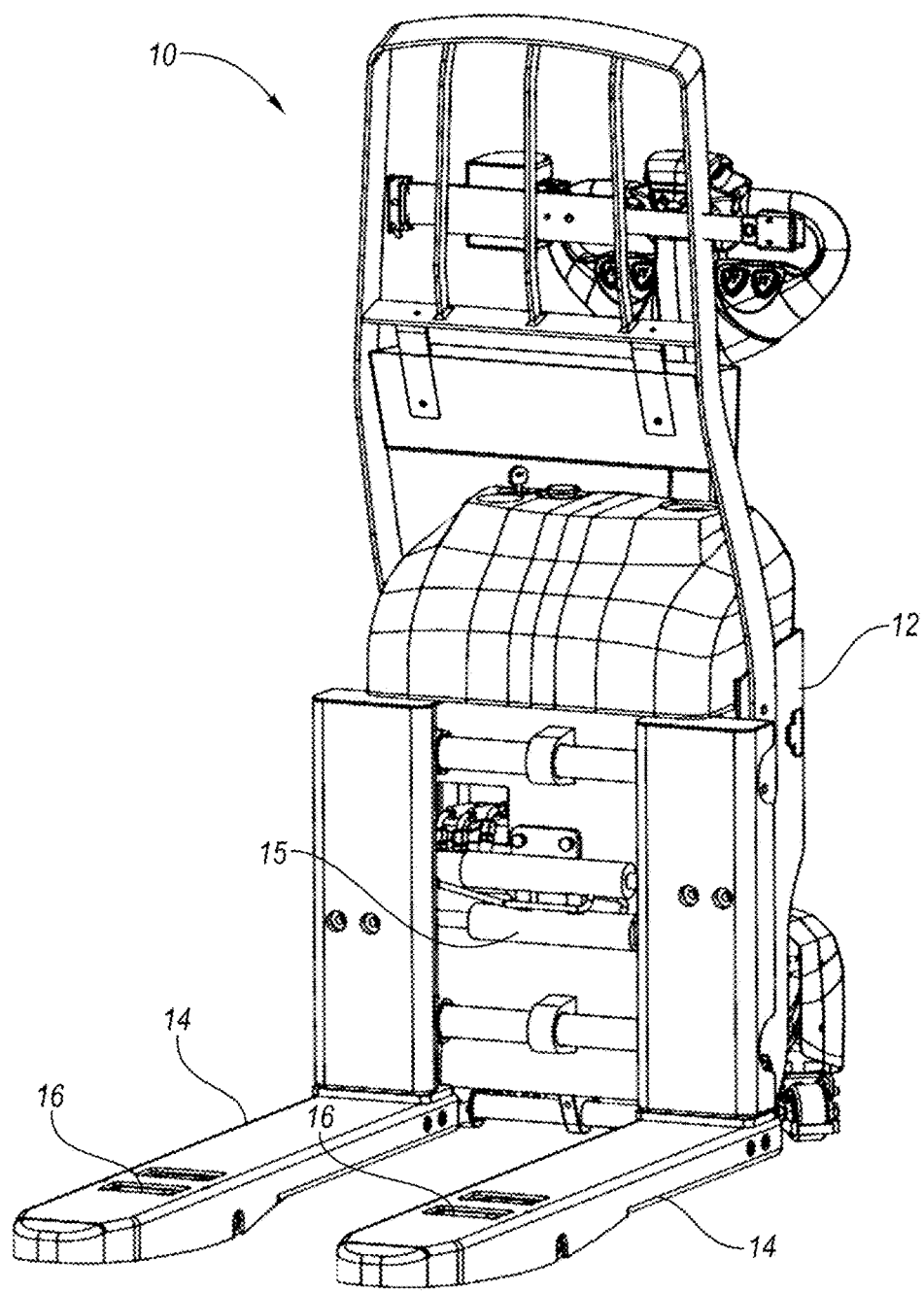
FIG. 5 shows the pallet sled of FIG. 1 with the tines in the spaced apart position.

In FIGS. 3 and 4, the tines 14 of the pallet sled 10 are spaced closed to one another. In FIG. 5, the tines 14 are spaced further apart. The actuators 15 for moving the tines 14 toward and away from each other are shown on the base 12. As will be explained below, the side wheels 22 permit the tines 14 to be moved toward and away from each other without dragging the load wheels 16 parallel to their axes 18, which could cause damage to the load wheels 16 and/or the floor.

Figure 6:
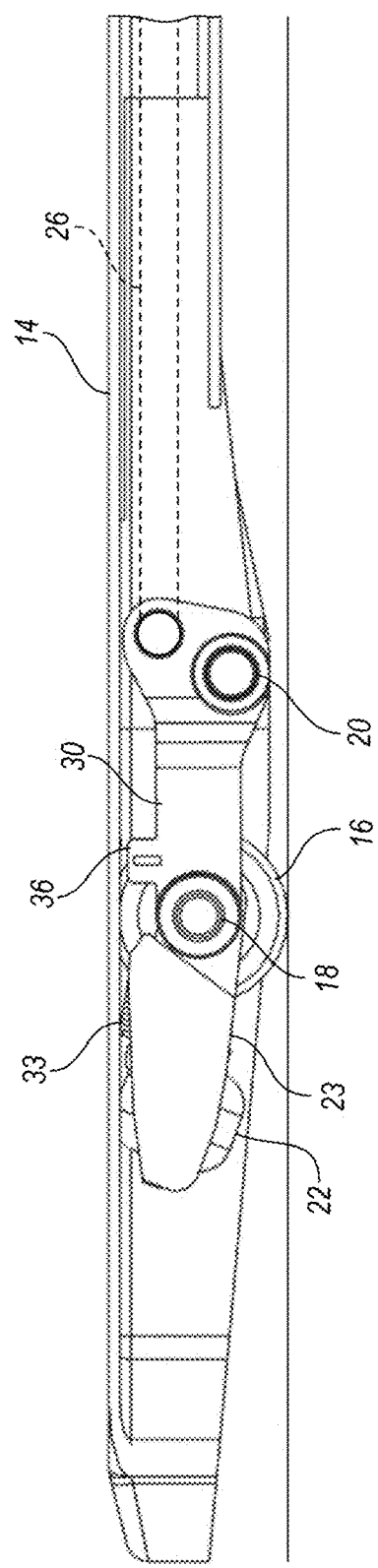
FIG. 6 shows one of the tines of FIG. 3, partially broken away.

FIG. 6 shows a side view of the tine 14 (without the base 12, for simplicity) and with part of the tine 14 broken away for illustration. The tine 14 is in the low position with the load wheel 16 retracted into the tine 14 as much as possible. In this position, the tines 14 are closest to the floor and can be slid under a pallet. The load wheel 16 is rotatable on the axis 18 at the end of the arm 30 which pivots about an axis 20 that is fixed to the tine 14. The push rod 26 is pivotably secured to a rearward portion of the arm 30 at a pivot point that is rearward and upward of the axis 20. In a generally known manner, the push rod 26 can, by forward motion, cause the load wheel 16 to deploy downward and lift the tine 14. By rearward motion, the push rod 26 causes the load wheel 16 to retract upward into the tine 14, lowering the tine 14 relative to the floor. The arms 30 each include a stop 36 projecting upward from a point rearward of the load wheel axis 18.

Figure 7:
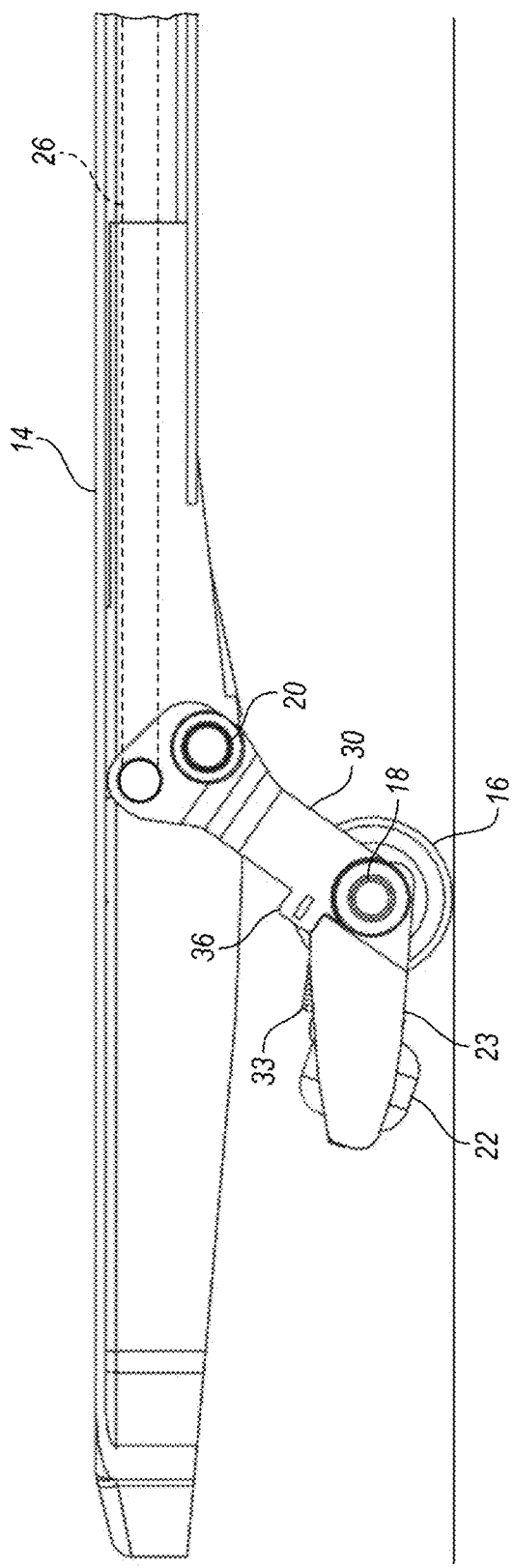
FIG. 7 shows the tine of FIG. 6 raised to the lift position.

Still referring to FIG. 6, stretching the springs 33 permits the load wheels 16 to move closer to the underside of the tines 14 by permitting rotation of the arms 23 downward away from the arms 30 to the position where both the arms 23 and the arms 30 are substantially horizontal. In FIG. 7, the springs 33 are contracted.

FIG. 7 shows the tines 14 in a lifted or high position, such as would be used to lift a pallet off a floor and move the pallet. The arms 30 are pivoted downward, thereby moving the load wheels 16 away from the tines 14, causing the tines 14 to move away from the floor, with the load wheels 16 on the floor. The side wheel 22 is rotatable on an axis almost parallel to arm 23. A spring 33 biases the arm 23 upward rotationally toward the arm 30 and toward the tine 14. The push rod 26 is moved forward to a mid position, such that the arms 30 pivot downward about axis 20 until the load wheel 16 is moved to a lift position away from the tine 14 but the side wheel 22 is still spaced above the floor. As the arms 30 pivot downward away from the underside of the tine 14, the spring 33 is able to pull the arms 23 about the axis 18 upward toward the arms 30 (and toward the tine 14) until the arms 23 contact the stops 36 on the arms 30. In this manner, the springs 33 hold the side wheels 22 off the floor in this high position.

Figure 8:
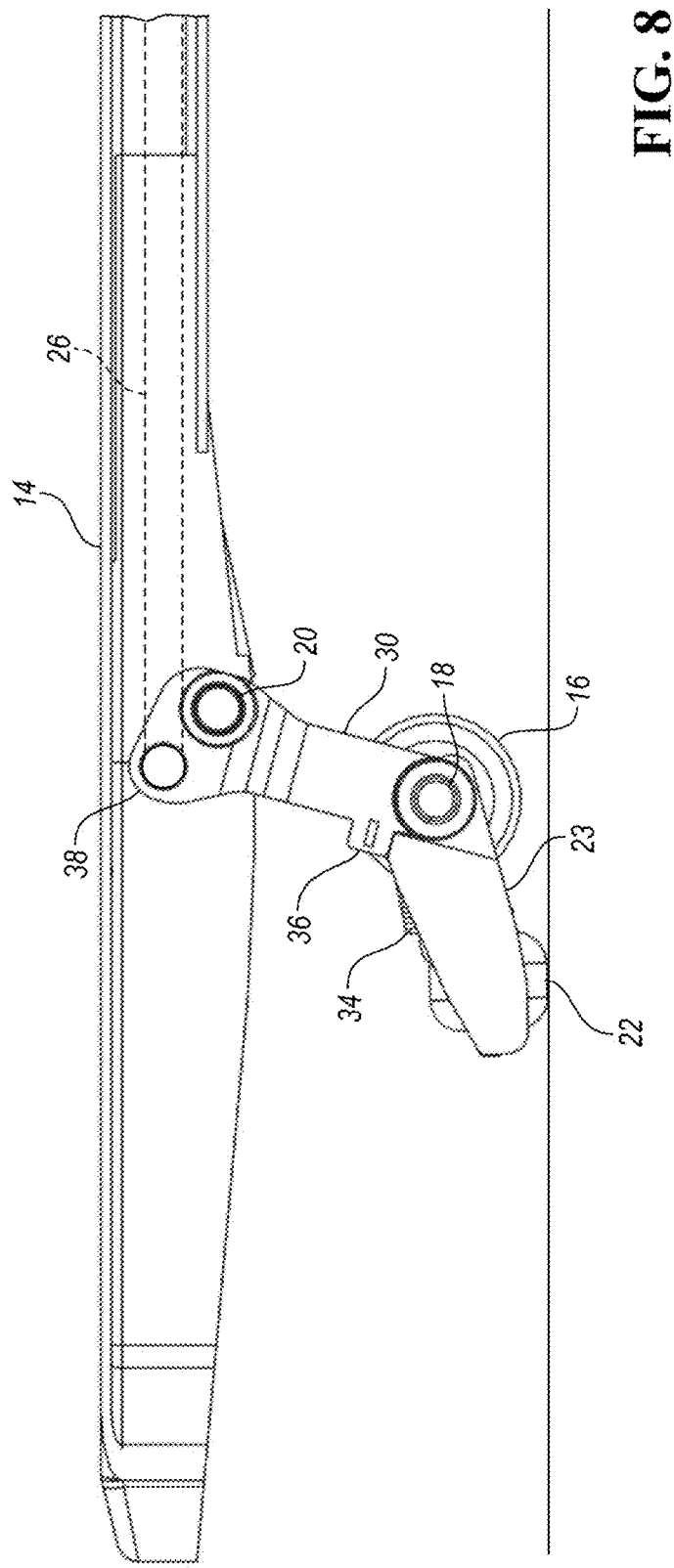
FIG. 8 shows the tine of FIG. 6 in the side shifting position.

FIG. 8 shows the tines 14 of the pallet sled 10 with the load wheels 16 and side wheels 22 moved to the side-shifting position, i.e. the side wheels 22 are in contact with the floor and the load wheels 16 are lifted off the floor. The push rod 26 has been moved forward to its furthest forward position, rotating the arms 30 downward to a maximum degree. This also rotates the arms 23 further downward until the side wheels 22 contact the floor, then lifting the load wheel 16 off the floor, and lifting the tines 14 even a little higher (this would not be done while the tines 14 are loaded). Each side wheel 22 provides a support surface configured to selectively be the lowermost surface of the tine to facilitate lateral displacement of the first tine.

The tines 14 can then be moved back toward one another as shown in FIGS. 3 and 4. The tines 14 would roll on the side wheels 22. With the load wheels 16 off the floor, movement of the tines 14 laterally does not damage the load wheels 16 or the floor. In this side-shifting position, the tines 14 can be moved laterally toward and away from one another. With the tines 14 closely-spaced near one another or spaced further apart from one another, the load wheels 16 and tines 14 can be moved back and forth between the lift position, the low position, and the side-shifting position.

Figure 9:
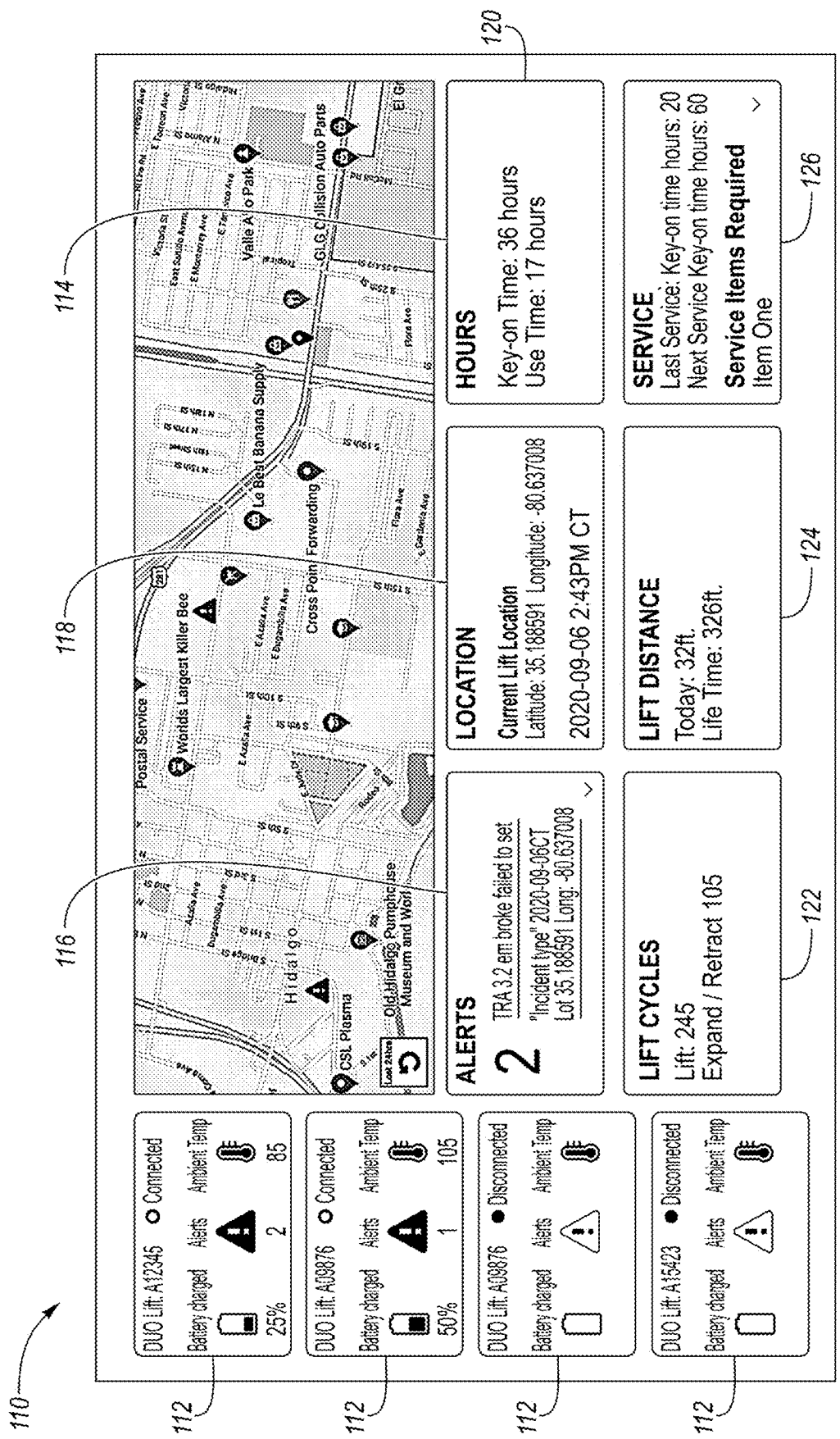
FIG. 9 shows an example display screen on the server of FIG. 1.

FIG. 9 shows an example display screen 110 from the server 34 of FIG. 1 (such as a workstation or mobile device remotely accessing data on the server 34). The display screen 110 will only show information regarding pallet sleds 10 to which the user has permission. For example, a site manager will only have access to their pallet sleds 10, while a regional manager will have access to all of the pallet sleds 10 in the area.

A small status window 112 for each pallet sled 10 (FIG. 1) is displayed on the screen 110. Each status window 112 gives a summary of the status of the associated pallet sled 10, which is identified in the window 112, including for example, whether the pallet sled 10 is currently connected to the server 34 (e.g. via communication circuit 95, FIG. 2), the current charging level of the battery in the pallet sled 10, whether there are any alerts associated with the pallet sled 10, and the ambient temperature around the pallet sled 10. The battery for powering the pallet sled 10 may only operate (charge or discharge) within a certain temperature range. Therefore, if the user sees a temperature outside that range, the battery may need to be removed for charging in a temperature-controlled environment.

A map 114 shows a current location of the pallet sleds 10, including whether there are associated alerts.

If the user selected one of the windows 112, the rest of the display shows more information. An alert window 116 is displayed for the selected pallet sled 10 giving more detail about the alerts, such as errors, failures, necessary maintenance, or other incidents. Location window 118 shows a specific location of the pallet sled 10, such as the lat/long and the date/time that the lat/long was received by the server 34. A time usage window 120 shows the elapsed time (e.g. hours) that the pallet sled 10 has been in an "on" mode and actual "use" time.

A cycle window 122 displays the number of lift cycles and (if applicable) the number of expansion/retraction cycles. A lift distance window 124 displays the total lift distance by the tines of the pallet sled 10 both in terms of a total for the current day and lifetime total. A service window 126 displays the key-on time since the last service on the pallet sled 10 and the key-on time until the next service should be performed. This time until next service could be based upon actual usage of the pallet sled 10, i.e. it could be based upon key-on time, use time, lift cycles, expansion/retraction cycles, and/or lift distance, or any combination or weighted combination of these. In the service window 126 specific service items may also be specified based upon reports from sensors onboard the pallet sled 10 and/or directly from the user.

Expanding the service window 126 (expanded window not shown) could provide a specific service alert regarding that pallet sled 10. For example, there may be a message describing the problem with the pallet sled 10 along with a recommendation for troubleshooting and/or repairing the problem. The display may provide a link that will order the necessary parts of the pallet sled 10 (based upon the detected error) and the specific steps needed to diagnose the problem further and/or to make the repair, such as how to install a replacement part. The service window 126 could alternatively be displayed by the CPU 93 on the pallet sled 10 itself, or on the mobile device 50.

In accordance with the provisions of the patent statutes and jurisprudence, exemplary configurations described above are considered to represent preferred embodiments of the inventions. However, it should be noted that the inventions can be practiced otherwise than as specifically illustrated and described without departing from its spirit or scope. Alphanumeric identifiers on method steps are solely for ease in reference in dependent claims and such identifiers by themselves do not signify a required sequence of performance, unless otherwise explicitly specified.

What is claimed is:

1. A pallet sled comprising:
   a base;
   a pair of tines extending forward from the base;
   a weight sensor configured to weigh objects on the pair of tines;
   a load wheel supporting each of the pair of tines, the load wheels each configured to move away from the respective tine to lift the respective tine upward relative to a support surface;

a communication circuit configured to send data from the pallet sled to a remote server; and at least one processor programmed to monitor usage of the pallet sled, including weight lifted by the pallet sled each time the pair of tines are lifted, and to communicate data regarding the usage of the pallet sled, including weight lifted by the pallet sled each time the pair of tines are lifted, to the remote server via the communication circuit.

2. The pallet sled of claim 1 further including a gps receiver mounted on the pallet sled, the communication circuit configured to receive a location of the pallet sled from the gps receiver and transmit the location to the remote server.

3. The pallet sled of claim 1 further including an rfid reader configured to read an rfid tag of a pallet on the tines of the pallet sled.

4. The pallet sled of claim 1 wherein the at least one processor is programmed to analyze a weight of a pallet on the tines as determined by the weight sensor and to determine based upon a weight of the pallet if the pallet is loaded correctly.

5. The pallet sled of claim 1 wherein usage of the pallet sled that the at least one processor is programmed to monitor includes time at each store to which the pallet sled is used to deliver items.

6. The pallet sled of claim 1 wherein usage of the pallet sled that the at least one processor is programmed to monitor includes unloading time in a store.

7. The pallet sled of claim 1 wherein the at least one processor is programmed to perform maintenance analysis of the pallet sled based upon the monitored usage of the pallet sled including weight lifted by the pallet sled each time the pair of tines are lifted.

8. A pallet sled comprising:
   a base;
   a pair of tines extending forward from the base;
   a load wheel supporting each of the pair of tines, the load wheels each configured to move away from the respective tine to lift the respective tine upward relative to a support surface;
   a communication circuit configured to send data from the pallet sled to a remote server; and
   a processor programmed to monitor usage of the pallet sled and to communicate data regarding the usage of the pallet sled to the remote server via the communication circuit;
   wherein usage of the pallet sled that the processor is programmed to monitor includes number of cycles that the pair of tines are raised to a lift position and unloading time in a store.

9. A delivery sled comprising:
   a base;
   a pair of tines extending forward from the base for supporting an object thereon;
   a load wheel supporting each of the pair of tines, the load wheels each configured to move away from the respective tine to lift the respective tine upward relative to a support surface on which the load wheel is supported;
   a gps receiver determining a location of the delivery sled; and
   a processor configured to determine if the object should be delivered based upon the location of the delivery sled.

10. The delivery sled of claim 9 further including a communication circuit configured to send data from the delivery sled to a remote server.

11. The delivery sled of claim 9 wherein the processor is configured to determine that the object should be delivered to a first location and to determine that the object should be delivered based upon the location of the delivery sled as determined by the gps receiver being the first location.

12. A method for making a delivery using the delivery sled of claim 9 including:
   a) reading an identification tag of a first pallet of a plurality of pallets, each of the plurality of pallets loaded with a plurality of items, each of the plurality of pallets having an identification tag associating said each pallet with a different one of a plurality of stores, including the first pallet being associated with a first store of the plurality of stores;
   b) the processor determining a current location of the plurality of pallets to be at the first store;
   c) the processor determining if the identification tag of the first pallet is associated with the first store; and
   d) based upon a determination that the identification tag of the first pallet is associated with the first store in step c), delivering the first pallet to the first store with the delivery sled.

13. A pallet sled comprising:
   a base;
   a pair of tines extending forward from the base;
   a load wheel supporting each of the pair of tines, the load wheels each configured to move away from the respective tine to lift the respective tine upward relative to a support surface;
   at least one processor recording data reflective of usage of the pallet sled, wherein the at least one processor is configured to record the data reflective of usage of the pallet sled including at least one of distance, weight, elapsed time, or temperature during usage of the pallet sled; and
   a communication circuit configured to send the data from the pallet sled to a remote server.

14. The pallet sled of claim 13 wherein the at least one processor records a location of the pallet sled over time.

15. The pallet sled of claim 14 wherein the data includes the location of the pallet sled.

16. The pallet sled of claim 13 wherein the at least one processor is configured to record distance traveled by the pallet sled during usage of the pallet sled.

17. The pallet sled of claim 13 wherein the at least one processor is configured to record the weight lifted by the pallet sled during usage of the pallet sled for a plurality of lift cycles.

18. The pallet sled of claim 13 wherein the at least one processor is programmed to perform maintenance analysis of the pallet sled based upon the data reflective of usage of the pallet sled.

19. The pallet sled of claim 13 in combination with the remote server, wherein the remote server is programmed to perform maintenance analysis of the pallet sled based upon the data reflective of usage of the pallet sled.

20. The combination of claim 19 wherein the remote server is programmed to perform maintenance analysis of the pallet sled based upon the data reflective of usage of the pallet sled including weight lifted by the pallet sled.

21. A pallet sled comprising:
   a base;
   a pair of tines extending forward from the base;
   a load wheel supporting each of the pair of tines, the load wheels each configured to move away from the respective tine to lift the respective tine upward relative to a support surface;

at least one processor recording data reflective of usage of the pallet sled; and a communication circuit configured to send the data from the pallet sled to a remote server, wherein the at least one processor is configured to determine a quantity of returnable packaging or pallets that is being returned from a store on the pallet sled and to communicate the quantity via the communication circuit.

22. The pallet sled of claim 21 in combination with a server configured to receive and accumulate the quantity of returnable packaging or pallets that is returned from the store over time and to compare the quantity returnable packaging or pallets that is returned from the store to a quantity of returnable packaging or pallets that is delivered to the store to determine a rate of asset loss.

23. The pallet sled of claim 21 further including a camera mounted to the pallet sled, wherein the at least one processor is configured to use the camera to determine quantity of returnable packaging or pallets that is being returned from a store on the pallet sled.

24. The pallet sled of claim 21 further including a weight sensor configured to weigh objects on the pair of tines, wherein the at least one processor is configured to use the weight sensor to determine quantity of returnable packaging or pallets that is being returned from a store on the pallet sled.

25. The pallet sled of claim 24 further including a camera mounted to the pallet sled, wherein the at least one processor is configured to use the camera to determine quantity of returnable packaging or pallets that is being returned from a store on the pallet sled.

26. The pallet sled of claim 24 in combination with a server configured to receive and accumulate the quantity of returnable packaging or pallets that is returned from the store over time and to compare the quantity returnable packaging or pallets that is returned from the store to a quantity of returnable packaging or pallets that is delivered to the store to determine a rate of asset loss.

\* \* \* \* \*